(No Model.)
C. J. STEWART.
INSECT EXTERMINATOR.
No. 597,032. Patented Jan. 11, 1898.
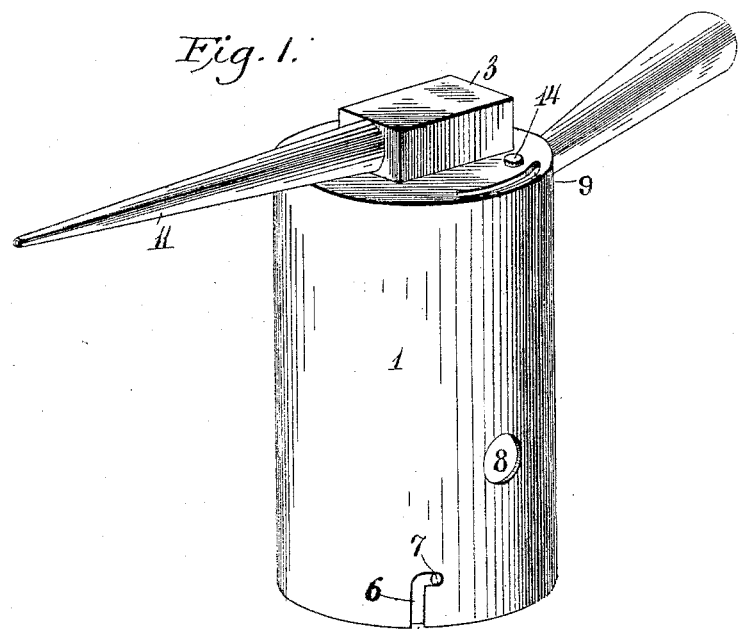
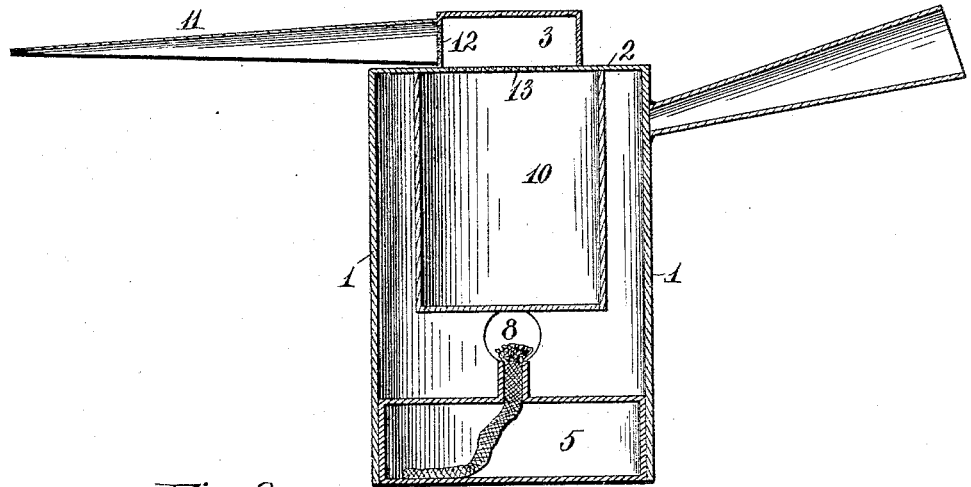
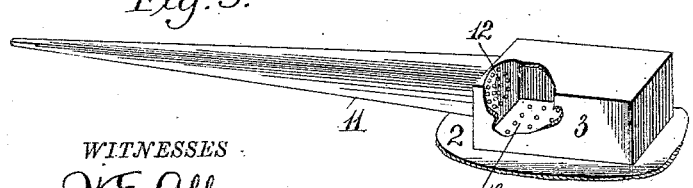
WITNESSES
W. E. Allen
J. G. Bowen
INVENTOR
Cornelius J. Stewart
by John Wedderburn
Attorney

UNITED STATES PATENT OFFICE.

CORNELIUS J. STEWART, OF CULLMAN, ALABAMA.

INSECT-EXTERMINATOR.

SPECIFICATION forming part of Letters Patent No. 597,032, dated January 11, 1898.

Application filed December 28, 1896. Serial No. 617,180. (No model.)

*To all whom it may concern:*

Be it known that I, CORNELIUS J. STEWART, a citizen of the United States, residing at Cullman, in the county of Cullman and State of Alabama, have invented certain new and useful Improvements in Insect-Exterminators; and I do hereby declare the following to be a full, clear, and exact description of the invention, such as will enable others skilled in the art to which it appertains to make and use the same.

My invention relates to improvements in insect-exterminators, and has for its object the production of a simple, durable, and efficient device designed to generate and direct steam for its utilization as an exterminating agent.

To the accomplishment of this and other objects my invention consists in providing a steam-generator within a suitable casing and a steam-nozzle in communication with the generator, located in a manner to facilitate the manipulation of the device.

Referring to the drawings, Figure 1 is a perspective view of my insect-exterminator. Fig. 2 is a central vertical section of the device. Fig. 3 is a detail perspective view of the steam chest and spout, part of the former being broken away for the purpose of disclosing the bottom of the steam-chest and the base of the spout.

Referring to the numerals on the drawings, 1 indicates a preferably cylindrical casing having a closed top 2, surmounted by a steam-chest 3, and an open bottom 4.

5 indicates a lamp fitted closely within the bottom of the casing 1 and secured thereto by bayonet-slots 6 adjacent to the lower edge of the casing and coöperating with diametrically opposite lugs 7, carried by the lamp.

8 indicates a series of apertures within the casing immediately above the top of the lamp and designed to supply air thereto to promote combustion, the top 2 being preferably provided with apertures 9, through which the products of combustion may escape.

10 indicates a steam generator or boiler depending from the top 2 to a suitable distance above the lamp and of somewhat smaller diameter than the casing, enabling the products of combustion to come into contact with its sides as well as with its bottom.

11 indicates a comparatively long tapering spout connected at its large end to one wall of the steam-chest 3 and having its end closed by a foraminous plate 12, which may either be separate or may constitute a portion of the end wall of the steam-chest. 13 indicates a similar numerously-perforated plate constituting the bottom of the steam-chest and through which communication is had between the steam-generator and the steam-chest. The purpose of these restricted openings between the generator and the steam-chest and between the latter and the nozzle is for the purpose of sufficiently retarding the egress of steam to create a sufficient steam-pressure to cause the steam escaping from the nozzle to be injected into corners or crevices in which the insects may be concealed. The casing is preferably provided with a handle, projecting in a direction opposite to the spout 11, and a screw-cap 14 is provided, which may be removed for the purpose of filling the generator or boiler with water.

In operation the lamp is lighted and is secured within the lower end of the casing by the bayonet-joint, the products of combustion coming into contact with the bottom and sides of the generator for the purpose of generating steam within the generator. The small extremity of the nozzle 11 is placed contiguous to the insects desired to be exterminated and the steam is injected with deadly effect into the smallest crevices serving as a place of concealment for the vermin.

Various modifications of my device might be devised—as, for instance, an ordinary grate or fire-box might be substituted for the lamp in the bottom of the casing—and I do not desire to limit myself to the details of construction herein shown and described, but reserve to myself the right to change, modify, or vary them within the scope of my invention.

What I claim as new, and desire to secure by Letters Patent, is—

1. In an insect-exterminator, the combination with a casing and a steam generator or boiler therein, of a heater within the casing below the generator, a steam-chest above the generator and communicating therewith through a foraminous bottom, and a steam-nozzle communicating with the steam-chest, substantially as specified.

2. In an insect-exterminator, the combination with a casing provided with a depending steam-generator of smaller diameter than said casing and supported exclusively by the top of the casing, a steam-chest above the steam-generator having a foraminous bottom and provided with a nozzle, a heater detachably secured within the bottom of the casing, and coöperating mechanism carried by the heater and casing, substantially as specified.

3. In an insect-exterminator the combination with the casing provided with a detachable heater, and an interior comparatively small steam generator or boiler, of a steam-chest above the casing and generator, communicating with the latter through a foraminous bottom, and a steam-nozzle communicating with the steam-chest through a foraminous plate, substantially as specified.

4. In an insect-exterminator the combination with the casing provided with a closed top, with bayonet-slots at its lower end, and with apertures above its lower end and in its top, of a lamp provided with diametrically-opposite lugs designed to engage the bayonet-slots in the casing, a steam-generator depending within the casing from its top and of comparatively small diameter; a steam-chest above the casing and a foraminous plate intermediate the generator and steam-chest; a tapering nozzle carried by the steam-chest and a foraminous plate intermediate the steam-chest and nozzle; a handle secured to the casing and a screw-cap designed to permit access to the generator, substantially as specified.

In testimony whereof I have signed this specification in the presence of two subscribing witnesses.

CORNELIUS J. $\overset{\text{his}}{\times}$ STEWART.
mark

Witnesses:
CHRIS. J. BROWN,
W. H. WHALEY.